(12) United States Patent
Avati et al.

(10) Patent No.: US 9,971,787 B2
(45) Date of Patent: *May 15, 2018

(54) UNIFIED FILE AND OBJECT DATA STORAGE

(75) Inventors: Anand Vishweswaran Avati, Mountain View, CA (US); Mohammed Junaid Ahmed, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 294 days.

This patent is subject to a terminal disclaimer.

(21) Appl. No.: 13/555,718

(22) Filed: Jul. 23, 2012

(65) Prior Publication Data

US 2014/0025711 A1 Jan. 23, 2014

(51) Int. Cl.
*G06F 12/00* (2006.01)
*G06F 17/30* (2006.01)

(52) U.S. Cl.
CPC .... *G06F 17/30194* (2013.01); *G06F 17/3089* (2013.01); *G06F 17/30238* (2013.01)

(58) Field of Classification Search
None
See application file for complete search history.

(56) References Cited

U.S. PATENT DOCUMENTS

| | | | |
|---|---|---|---|
| 5,721,919 A * | 2/1998 | Morel | G06F 17/30607 |
| 5,886,699 A | 3/1999 | Belfiore et al. | |
| 5,951,649 A * | 9/1999 | Dobbins et al. | 709/238 |
| 6,466,980 B1 | 10/2002 | Lumelsky et al. | |
| 6,629,110 B2 | 9/2003 | Cane et al. | |
| 6,697,846 B1 | 2/2004 | Soltis | |
| 6,938,039 B1 | 8/2005 | Bober et al. | |
| 7,080,102 B2 | 7/2006 | O'Connell et al. | |
| 7,418,439 B2 | 8/2008 | Wong | |
| 7,428,540 B1 * | 9/2008 | Coates et al. | |
| 7,624,443 B2 | 11/2009 | Kramer et al. | |
| 7,818,536 B1 * | 10/2010 | Todd | G06F 17/30067 711/108 |
| 7,877,511 B1 * | 1/2011 | Berger et al. | 709/242 |
| 7,890,469 B1 | 2/2011 | Maionchi et al. | |
| 8,010,543 B1 * | 8/2011 | Armangau | G06F 17/30088 707/758 |
| 8,046,561 B1 * | 10/2011 | Todd | G06F 17/30097 711/108 |

(Continued)

OTHER PUBLICATIONS

Gluster Inc., "Gluster Filesystem Unified File and Object Storage—Beta 2", Published Aug. 2011, pp. 1-27, Available at http://hypnotoad.uchicago.edu/roll-documentation/glusterfs/6.0/Gluster_Unified_File_and_Object_Storage.pdf, retrieved Jan. 18, 2013.*

(Continued)

*Primary Examiner* — David T Brooks
(74) *Attorney, Agent, or Firm* — Lowenstein Sandler LLP

(57) ABSTRACT

A server computing device receives, from a client computing device, a hypertext transfer protocol (HTTP) request to perform an operation on an object. The server computing device identifies a file, that corresponds to the object, in a network attached storage file system in a local area network. The server computing device mounts, via the local area network, the network attached storage file system to perform the operation using the file that corresponds to the object. The computer device sends a HTTP response indicating performance of the operation to the client computing device.

20 Claims, 5 Drawing Sheets

(56) References Cited

U.S. PATENT DOCUMENTS

| | | | |
|---|---|---|---|
| 8,095,542 B1* | 1/2012 | Teugels | G06F 17/30091 707/716 |
| 8,117,294 B2 | 2/2012 | Pollakowski et al. | |
| 8,180,843 B2* | 5/2012 | Wong et al. | 709/214 |
| 8,924,425 B1* | 12/2014 | Pandey | G06F 17/303 707/792 |
| 2001/0051955 A1* | 12/2001 | Wong | 707/201 |
| 2002/0107874 A1 | 8/2002 | DeLorme et al. | |
| 2003/0101189 A1* | 5/2003 | Lanzatella | G06F 17/30067 |
| 2003/0115439 A1 | 6/2003 | Mahalingam et al. | |
| 2003/0140051 A1* | 7/2003 | Fujiwara | H04L 67/1097 |
| 2003/0159006 A1* | 8/2003 | Frank et al. | 711/147 |
| 2003/0163568 A1* | 8/2003 | Kano et al. | 709/225 |
| 2003/0182257 A1 | 9/2003 | O'Connell et al. | |
| 2003/0187883 A1* | 10/2003 | Zelenka | G06F 17/30088 |
| 2004/0071708 A1 | 4/2004 | Claassen et al. | |
| 2004/0128556 A1 | 7/2004 | Burnett | |
| 2004/0220960 A1* | 11/2004 | Ojeil | G06F 17/30315 |
| 2004/0236761 A1* | 11/2004 | Both | G06F 17/30097 |
| 2005/0071708 A1 | 3/2005 | Bartfai et al. | |
| 2005/0144254 A1 | 6/2005 | Kameda | |
| 2006/0143340 A1 | 6/2006 | Labar | |
| 2006/0173855 A1* | 8/2006 | Turner | H04L 67/1002 |
| 2006/0294039 A1 | 12/2006 | Mekenkamp et al. | |
| 2007/0055703 A1* | 3/2007 | Zimran | G06F 17/30123 |
| 2007/0073829 A1* | 3/2007 | Volodarsky | G06F 17/30463 709/217 |
| 2007/0150499 A1 | 6/2007 | D'Souza et al. | |
| 2007/0162515 A1 | 7/2007 | Sarma et al. | |
| 2007/0245112 A1 | 10/2007 | Grubbs et al. | |
| 2008/0086518 A1 | 4/2008 | Balakrishnan et al. | |
| 2008/0114854 A1* | 5/2008 | Wong et al. | 709/214 |
| 2008/0235300 A1 | 9/2008 | Nemoto et al. | |
| 2009/0157641 A1* | 6/2009 | Andersen | H04L 29/12132 |
| 2009/0254592 A1 | 10/2009 | Marinov et al. | |
| 2009/0307245 A1 | 12/2009 | Mullen et al. | |
| 2009/0307276 A1 | 12/2009 | Dolan, IV et al. | |
| 2009/0319585 A1* | 12/2009 | Gokhale | G06F 17/30902 |
| 2010/0005072 A1 | 1/2010 | Pitts | |
| 2010/0023722 A1 | 1/2010 | Tabbara et al. | |
| 2010/0094847 A1* | 4/2010 | Malan et al. | 707/705 |
| 2010/0241726 A1 | 9/2010 | Wu | |
| 2010/0332456 A1* | 12/2010 | Prahlad et al. | 707/664 |
| 2011/0087642 A1 | 4/2011 | Rajamani et al. | |
| 2011/0137966 A1* | 6/2011 | Srinivasan | H04L 67/1097 707/828 |
| 2012/0185555 A1* | 7/2012 | Regni | G06F 9/465 709/214 |
| 2012/0185926 A1 | 7/2012 | Topatan et al. | |
| 2012/0330894 A1* | 12/2012 | Slik | 707/626 |
| 2013/0007051 A1 | 1/2013 | Astle et al. | |
| 2013/0007220 A1 | 1/2013 | Astle et al. | |
| 2013/0185258 A1* | 7/2013 | Bestler | G06F 17/30197 707/638 |
| 2014/0082508 A1 | 3/2014 | Rajashekar et al. | |

OTHER PUBLICATIONS

BusinessWire, "Gluster Announces Apache Hadoop Storage Comptibility in Latest GlusterFS Release", Published Aug. 23, 2011, Available at http://www.businesswire.com/news/home/20110823005899/en/Gluster-Announces-Apache-Hadoop-Storage-Compatibility-Latest , retreieved Jan. 18, 2013.*

Golub, Ben, "Why I believe in UFOS: Unified file and object storage," Computerworld Blogs, Jul. 28, 2011, 6 pages.

USPTO Office Action for U.S. Appl. No. 13/769,087, dated Sep. 17, 2013.

USPTO Office Action for U.S. Appl. No. 13/686,091, dated Jan. 30, 2013.

USPTO Office Action for U.S. Appl. No. 13/686,091, dated Jul. 16, 2013.

USPTO Office Action for U.S. Appl. No. 13/686,091, dated Jul. 30, 2014.

USPTO Office Action for U.S. Appl. No. 13/740,084, dated May 22, 2013.

USPTO Office Action for U.S. Appl. No. 13/740,084, dated Feb. 25, 2014.

USPTO Office Action for U.S. Appl. No. 13/740,084, dated Jun. 13, 2014.

USPTO Office Action for U.S. Appl. No. 13/740,084, dated Nov. 6, 2013.

USPTO Office Action for U.S. Appl. No. 13/757,437, dated May 17, 2013.

USPTO Office Action for U.S. Appl. No. 13/757,437, dated Nov. 19, 2013.

USPTO Notice of Allowance for U.S. Appl. No. 13/757,437, dated Jan. 27, 2014.

USPTO Office Action for U.S. Appl. No. 13/769,087, dated May 14, 2013.

USPTO Notice of Allowance for U.S. Appl. No. 13/757,437, dated Jul. 2, 2014.

USPTO Office Action for U.S. Appl. No. 13/769,087, dated Apr. 11, 2014.

* cited by examiner

UNIFIED FILE AND OBJECT DATA STORAGE

TECHNICAL FIELD

Embodiments of the present invention relate to data storage, and more particularly, to unified file and object data storage.

BACKGROUND

Data may be stored in a structured data format, such as in a database, and/or data may be stored as unstructured data, for example, in files and directories in a digital file system. Typically, client devices would access the files in the file system by performing a mount operation on the file system. Mounting takes place before a computer (e.g., client device) can access any data in the file system. A user device can access files on mounted media. Once the mount operation is performed, the client device can read the files and directories. The data may be stored outside of a local area network. For example, the data may be stored in a remote data center. If a user wishes to access the data across a wide area network (e.g., Internet), traditionally, the client device cannot perform a mount operation, and the client device cannot access the data as files and directories in the file system over the wide area network.

Some applications may provide access to data using a particular application programming interface (API), which may not be compatible with a certain type of storage system. For example, an application may use an API that accesses data as files and directories in a file system. Another application may use an API that accesses data as objects in an object storage system. Such applications, which have limited API implementation, may not be able to have access to the same data.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Figure 1:
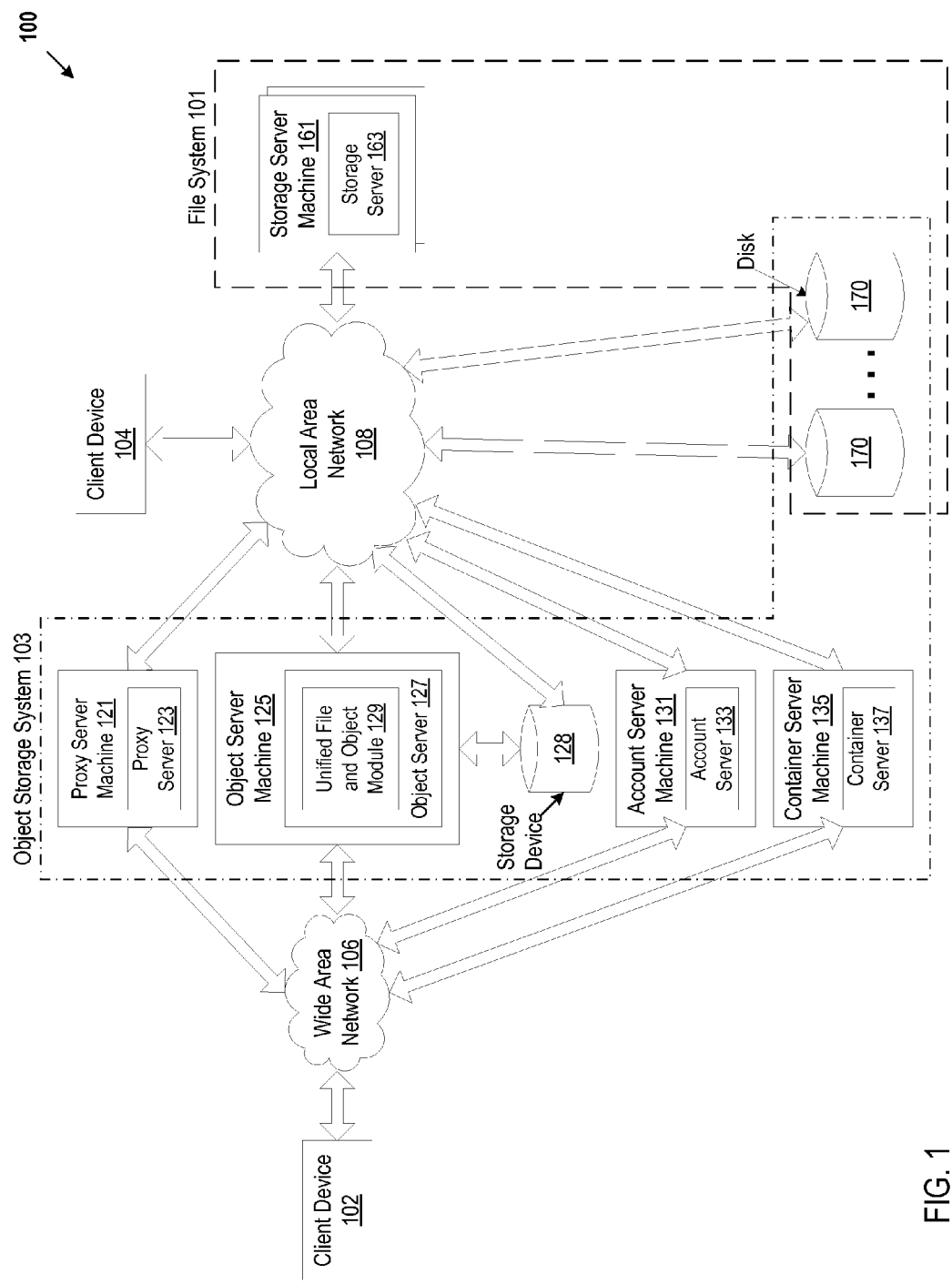
FIG. 1 illustrate exemplary network architectures, in accordance with various embodiments of the present invention.

Described herein are a method and apparatus for unified file and object data storage. A file system stores data as files on disks. The disks can be organized into volumes. The files can be organized in directories, such as a top-level directory and one or more sub-directories, which are associated with volumes. An object data storage system stores data as objects. The objects can be organized in containers. Containers can be organized into accounts. An object is a basic storage entity that represents the data being stored. Embodiments map object identifiers, container identifiers, and account identifiers in an object storage system to existing files, directories, and volumes in a file system in the back-end, which adds object access to the existing files in the file system and enables client applications to access the files in the file systems as objects across a wide area network (WAN) and/or a local area network (LAN). Embodiments map volumes, directories, and file names in a file system to existing account identifiers, container identifiers, and object identifiers in an object storage system in the back-end, which enables client applications to access the existing objects in the object server as files in a file system across a LAN.

For example, a user may have a client device connected to a LAN and may mount a file system to access an existing file "cat.jpg." The user may disconnect the client device from the LAN, decide to work from home, and attempt to access the "cat.jpg" file outside of the LAN. The client device cannot mount the file system to access the file "cat.jpg" using a WAN because the file system cannot be mounted over a WAN. Embodiments overcome this problem by allowing the client device to access the file via an object storage system, which acts as an intermediary between the client device and the file system. In particular, the client device can connect to the object storage system via the WAN and send a HTTP GET request using an object identifier, a container identifier, and an account identifier to access the file "cat.jpg" in the file system in the back-end. An object server receives the HTTP GET request for "cat.jpg" and uses mapping information and the identifiers in the HTTP request to locate the file "cat.jpg" in the file system in the back-end. The object server mounts, via the LAN, the file system to retrieve the file "cat.jpg" and sends, via the WAN network, a HTTP response that includes the data for the file "cat.jpg" to the client device.

Embodiments describe a server computing device receiving, via the WAN or LAN from a client device, a hypertext transfer protocol (HTTP) request to perform an operation on an object. The server computing device identifies, using mapping information that associates object storage system data to network attached storage file system data, a file that corresponds to the object. The file resides in a network attached storage file system in a LAN. The server computing device mounts, via the LAN, the network attached storage file system to perform the operation using the file that corresponds to the object. The server computer device can send, via the WAN or LAN, a HTTP response indicating performance of the operation to the client device.

Embodiments of the invention provide flexibility for client devices to access the same data, within a local network, as files and directories from a file system, and across a WAN (e.g., Internet) or LAN as objects from an object server. Embodiments provide access to the same data, both as an object and as a file, to simplify management and reduce storage costs. Embodiments enforce security of the same data by retaining access control of the data in both the object storage system and the file system.

FIG. 1 is an exemplary system architecture 100 in which embodiments can be implemented. The system architecture 100 can include a distributed file system 101 as a back-end file system for an object storage system 103 connected via a local area network 108. The network 108 may be a public network, a private network, or a combination thereof. The file system 101 can be coupled to one or more client devices 104 via the LAN 108. The object storage system 103 can be coupled to one or more client devices 102 via a wide area network 106 and to the one or more client devices 104 via the LAN 108. Networks 106,108 can include a wireless infrastructure. The wireless infrastructure may be provided by one or multiple wireless communications systems, such as a wireless fidelity (WiFi) hotspot connected with the network 106,108 and/or a wireless carrier system that can be implemented using various data processing equipment, communication towers, etc.

In one embodiment, a client device 102,104 is a client machine hosting one or more applications. An application can be any type of application including, for example, a web application, a desktop application, a browser application, etc. The client device 102,104 may be a portable computing device such as, and not limited to, mobile telephones, personal digital assistants (PDAs), portable media players, netbooks, laptop computers, an electronic book reader and the like. The client device 102,104 may also be other types of computing devices such as a server computer, a desktop computer, a set-top box, a gaming console, a television, etc. that may not traditionally be considered to be portable.

A distributed file system 101 can be a network attached storage file system that includes one or more storage server machines 161 and any number of disks 170 coupled to the storage server machines 161 via the LAN 108. A storage server machine 161 can include a network-accessible server-based functionality (e.g., storage server 163) or other data processing equipment. The storage server machines 161 can include, and are not limited to, any data processing device, such as a desktop computer, a laptop computer, a mainframe computer, a personal digital assistant, a server computer, a handheld device or any other device configured to process data.

The distributed file system 101 can organize data in the disks 170 using volumes. A volume is a single accessible storage area of the file system 101, which can be resident on a single partition of a hard disk 170 of the file system 101. The distributed file system 101 can store data as files and can include directories, also referred to as folders, which are virtual containers within the file system 101, in which groups of computer files and possibly other directories can be kept and organized. Related files can be stored in the same directory. A sub-directory, also referred to as a sub-folder, is a directory contained inside another directory. The top-most directory is referred to as a root or top-level directory within the file system 101. Together, the directories form a hierarchy, or tree structure of one or more levels in the file system 101.

The object storage system 103 can include one or more proxy servers 123 coupled to one or more object servers 127 via the LAN 108 and/or the WAN 106. The object storage system 103 may be a distributed storage system having multiple object servers 127. In one embodiment, the object storage system 103 includes one or more proxy servers 123, one or more account servers 133, one or more container servers 137, and one or more object servers 127 coupled via the LAN 108 and/or the WAN 106. A proxy server machine 121 can include a network-accessible server-based functionality (e.g., proxy server 123) or other data processing equipment. An object server machine 125 can include a network-accessible server-based functionality (e.g., object server 127) or other data processing equipment. An account server machine 131 can include a network-accessible server-based functionality (e.g., account server 133) or other data processing equipment. A container server machine 135 can include a network-accessible server-based functionality (e.g., container server 137) or other data processing equipment. The proxy server machines 121, object server machines 127, account server machines 131, and container server machines 135 can include, and are not limited to, any data processing device, such as a desktop computer, a laptop computer, a mainframe computer, a personal digital assistant, a server, a handheld device or any other device configured to process data.

A container is a storage compartment for organizing the data being stored. Containers can classify a group of objects by giving the group of objects a group identity. One or more objects can be associated with a container. A container server 137 can manage listings and groupings of objects. One or more containers can be associated with an account. An account can be owned by an entity. An entity, as referred to herein, can represent any person, a business organization such as a corporation, an educational institution such as a college and university, etc. An account server 133 can manage listings and groupings of containers.

The object storage system 103 allows unstructured data (e.g., files and directories) to be accessed over the WAN 106 (e.g., Internet) and the LAN 108 by using HTTP. An object is a basic storage entity that represents the data being stored. An object server 127 can store, retrieve, and delete objects in one or more local storage devices 128. Client devices 102,104 can perform various operations on an object. For example, a client device 102 can perform a HTTP GET operation over the WAN 106 to retrieve an object from an object server 127 via a proxy server 123. In another example, the client device 102 can perform a HTTP PUT operation over the WAN 106 to add the object to the object storage server 127.

The object server 127 can include a unified file and object (UFO) module 129 to allow client devices 102,104 to access the same data, both as an object and as a file. The UFO module 127 can provide object access, for example, via HTTP operations over the WAN 106 and the LAN 108, to existing files and directories in the file system 101, by mapping object identifiers, container identifiers, and account identifiers in the object storage system 103 to the existing files, directories, and volumes in the file system 101. In addition or alternatively, the UFO module 129 can present existing objects and containers in the object storage system 103 as files and directories in the file system 101 in the LAN 108 by mapping volumes and file paths in the file system 101 to existing account identifiers, container identifiers, and object identifiers in the object storage system 103.

The UFO module 129 allows client applications, which access data using a particular API, to access data that is stored in a system that is not compatible with the API. The UFO module 129 allows any new files and directories created using the mount-point via the LAN 108 to be made visible as objects and containers to the client device 102 via HTTP over the WAN 106 and to the client device 104 via HTTP over the LAN 108. For example, client device 104 can use a mount-point, via the LAN 108, on the file system 101 to perform file operations, such as creating new files and directories. The UFO module 129 can make the new files and directories visible to the client device 102, via HTTP over the WAN 106, as objects and containers, and visible to the client device 104, via HTTP over the LAN 108, as objects and containers.

The UFO module 129 allows any new containers and objects created using HTTP via the LAN 108 or WAN 106 to be made visible as directories and files from the mount-point via the LAN 108. A client device 104 can mount the file system, via the LAN, and use the directories and files to read and/or write to these objects. Any changes made by the client device 104 to the objects via the mount-point can be visible via HTTP and the object storage system. For example, client device 102 can see the changes via HTTP over the WAN 106 and client device 104 can see the changes via HTTP over the LAN 108.

For example, a mobile camera client application on the client device 102 may use an object storage API to upload images taken by the client device 102 as objects to the object server 127. The mobile camera application may not interface with files and directories. A data center may include an image processing server machine that hosts an image processing application. The image processing application may be implemented to work on images using a file system API. The image processing application may be a client to the storage server 163 in the file system 101. For example, the image processing application may be hosted on client device 104. The image processing client application may not interface with objects. The UFO module 129 allows the mobile camera client application on the client device 102 to use the object storage API to upload an image "bird.jpg" as an object in a container in an account and store the object "bird.jpg" in the storage device 128 via the object server 127. The UFO module 129 can make the container and object appear as directories and a file from the mount-point by creating a volume and file path that maps to the account identifier, container identifier, and object identifier for the existing uploaded image object "bird.jpg." The mapping allows the image processing client application on the client device 104 to use the file system API, volume, and file path to access the existing uploaded image object "bird.jpg" in the storage device 128. The image processing client application on the client device 104 may change the object "bird.jpg" via the mount-point. The change made by the image processing client application can be visible via HTTP and the object storage system. For example, the mobile camera client application on client device 102 can see the change to the object "bird.jpg" via HTTP over the WAN 106.

In another example, the image processing client application on the client device 104 can use the mount-point, via the LAN 108, to store an image "fish.jpg" as a file in directories on a volume on disks 170 in the file system 103. The UFO module 129 can make the file "fish.jpg" and the corresponding directories and volume visible via HTTP as an object, container, and account. The UFO module 129 can create an object identifier, container identifier, and account identifier that maps to the existing image file "fish.jpg". The mobile camera client application on the client device 102 can use the object identifier, container identifier, and account identifier to access the existing image file "fish.jpg" on the disks 170 in the file system 101.

The UFO module 129 can create mapping data to map the object identifiers, container identifiers, and account identifiers in the object storage system 103, and the volumes and file paths in the file system 101 to each other. One embodiment of creating mapping data is described in greater detail below in conjunction with FIG. 2. The UFO module 129 can create an object identifier, a container identifier, and an account identifier that map to an existing file, directories, and volume in the file system 101. For example, the client device 104 may send a request, via the LAN 108, to the storage server 163 to store a file "dog.jpg" in the disks 170 in the file system 101, and the storage server 163 creates a volume, directories, and file for the file "dog.jpg." When the file "dog.jpg" is stored, the UFO module 129 can create an object identifier, a container identifier, and an account identifier in the object storage system 103 to correspond to the existing file, directories, and volume for the file "dog.jpg." The UFO module 129 also creates mapping data that includes the object identifier, container identifier, and account identifier pointing to the existing file, directories, and volume for the file "dog.jpg" in the file system 101. The client device 102,104 can access the existing file "dog.jpg" in the file system 101 as an object using HTTP, the mapping data, and the object identifier, container identifier, and account identifier in the object storage system 103 which map to the existing file "dog.jpg" in the file system 101 in the back-end.

The UFO module 129 can create a volume and a file path in the file system 101 to correspond to an existing object in the object storage system 103. For example, the client device 102,104 may send a HTTP PUT request, via the WAN 106 or LAN 108, to the proxy server 123 to store an object "lemon.jpg" in the object storage system 103. The proxy server 123 forwards the HTTP PUT request to the object server 127, and the object server 127 stores the object "lemon.jpg" in the storage device 128. The stored object "lemon.jpg" has an account identifier, container identifier, and object identifier. When the object is stored, the UFO module 129 creates a volume and a file path having a top-level directory, sub-directories, and file name in the file system 101 for the stored object "lemon.jpg." The UFO module 129 also creates mapping data that includes the volume and file path pointing to the existing account identifier, container identifier, and object identifier for the object "lemon.jpg" that is stored in the object storage system 103. The client device 104 that is connected to the LAN 108 can access the existing object "lemon.jpg" in the object storage system 103 as a file using the mapping data, and the volume and file path in the file system 101 that points to the existing object "lemon.jpg" in the object storage system 103 in the back-end.

An object storage system 103 that includes more than one account server 133, more than one container server 135, or more than one object server 127 is a distributed object storage system 103. The UFO module 129 can create system correlation data, which correlates the distributed object storage system to a non-distributed object storage system. One embodiment of correlating a distributed object storage system to a non-distributed object storage system is described in greater detail below in conjunction with FIG. 2. The system correlation data can include data describing that the data in the object storage system 103 is available from a single local object server 127, a single local container server 135, and/or a single local account server 133. For example, the system correlation data indicates that the objects correspond to Object-Server-2. The system correlation data instructs the proxy server 123 that there is a single instance of an object server 127, a single instance of a container server 137, and a single instance of an account server 133, to correlate the distributed object storage system 103 to a non-distributed object storage system 103. A proxy server 123 can receive operation requests from client devices 102 and re-route the requests to the single instance of an object server 127, the single instance of a container server 137, or the single instance of an account server 133, accordingly.

Figure 2:
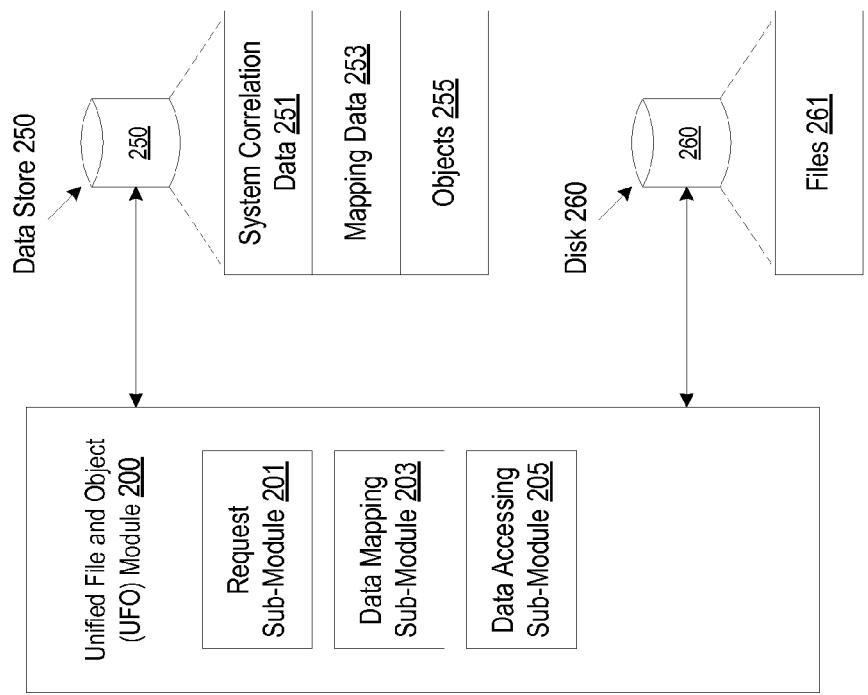
FIG. 2 is a block diagram of an embodiment of a unified file and object module.

FIG. 2 illustrates a block diagram of one embodiment of a unified file and object (UFO) module 200. The UFO module 200 may correspond to a UFO module 129 in machine 125 of FIG. 1. The UFO module 200 includes a request sub-module 201, a data mapping sub-module 203, and a data accessing sub-module 205.

The request sub-module 201 can receive requests to perform an operation on data. The data, for example, may be an object 255 that is stored or is to be stored in a data store 250 that is coupled to the UFO module 200. In another example, the data may be a file 261 that is stored or is to be stored in a volume on a disk 260 that is coupled to the UFO module 200. Examples of performing an operation on data can include, and are not limited to, reading data, writing data, deleting data, etc. A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The request can be received over a network from a client application executing on a client device (e.g., client device 102,104 in FIG. 1). The request can be a HTTP request, which includes an object identifier, a container identifier, and an account identifier, that is received over a WAN (e.g., Internet) or LAN. Examples of a HTTP request can include, and are not limited to, HTTP GET, HTTP PUT, and HTTP DELETE. Alternatively, the request can be a file system access command, which includes a volume and a file path, that is received over a LAN. Examples of a file system access command received over a LAN can include, and are not limited to, a remove (e.g., "rm") command, a read command, a write command, and an open command.

The request sub-module 201 can send a status message to a requester (e.g., client application) indicating the status of an operation. Examples of a status message can include, and are not limited to, a HTTP response sent via a WAN or LAN, and a file system response sent via a LAN. The status can indicate whether or not an operation is successful. If an operation is not successful the status can indicate a reason. In one embodiment, the status message is a status code. In another embodiment, the status message is a text description of the status. Examples of a text description for a status message can include, and are not limited to, success, error, created, no error, operation successful, resource not found, authentication required, timeout, etc. The status message can include the requested data. For example, if the request includes an object identifier, a container identifier, and an account identifier, the request sub-module 201 may send a HTTP response that includes the file 261, which the object identifier, container identifier, and account identifier are mapped to. In another example, if the request includes a volume and a file path, the request sub-module 201 may send a file system response that includes the object 255, which the volume and file path are mapped to.

The request sub-module 201 can create system correlation data 251 that correlates a distributed object storage system to a non-distributed object storage system. An object storage system that includes more than one account server, more than one container server, or more than one object server is a distributed object storage system. A proxy server in an object storage system may access distribution data that describes how objects are distributed amongst the multiple object servers. The distribution data can use hash values of the object identifiers to describe how the objects are distributed amongst the object servers. For example, the distribution data may describe that hash values 0-100 may correspond to Object-Server-2, hash values 101-200 may correspond to Object-Server-3, hash values 201-300 may correspond to Object-Server-4, etc. The proxy server may receive a HTTP request to access an object and can use the distribution data to identify which of the object servers to re-route the request to.

The request sub-module 201 can create system correlation data 251 to replace the distribution data to describe that the objects 255 and data (e.g., account data, container data) pertaining to the objects 255 in the object storage system are available from a single local object server, a single local container server, and a single local account server. For example, the system correlation data 251 indicates that the hash values correspond to Object-Server-2. The system correlation data 251 instructs the proxy server that there is a single instance of an object server, a single instance of a container server, and a single instance of an account server, to correlate the distributed object storage system to a non-distributed object storage system.

The system correlation data 251 is accessible by one or more proxy servers (e.g., proxy server 123 in FIG. 1). In one embodiment, the request sub-module 201 sends the system correlation data 251 to a proxy server and the proxy server stores the system correlation data 251 locally. A proxy server can receive operation requests from client devices and re-route the requests to the single instance of an object server, the single instance of a container server, or the single instance of an account server, accordingly. The request sub-module 201 can store the system correlation data 251 in a data store 250 that is coupled to the UFO module 200.

The data mapping sub-module 205 can create mapping data 253 that maps object identifiers, container identifiers, and account identifiers in an object storage system (e.g., object storage system 103 in FIG. 1) and to existing files, directories, volumes in a file system (e.g., file system 101 in FIG. 1). The data mapping sub-module 205 can create mapping data 253 that maps volumes and file paths in a file system to existing account identifiers, container identifiers, and object identifiers in an object storage system.

The data mapping sub-module 205 can create identifiers (e.g., object identifiers, container identifiers, account identifiers), in the object storage system, that correspond to existing files, directories, and volumes in the file system. The mapping data 253 can create an account identifier in the object storage system for each volume in the file system, a container identifier in the object storage system in each top-level directory inside each volume in the file system, and an object identifier for each combination of one or more sub-directories and/or file name for each top-level directory. For example, the file system stores a file name "elephant.jpg" in a volume labeled "media_files," a top-level directory named "photos," and a sub-directory named "animals." The file path may be "/photos/animals/elephant.jpg." When the file is created, the data mapping sub-module 205 may create an object identifier "animals/elephant.jpg," a container identifier "photos," and an account identifier "media_files," in the object storage system to correspond to the file, directories, and volumes for the file "elephant.jpg." The data mapping sub-module 205 may create and/or update mapping data 251 to map the object identifier, container identifier, and account identifier to the existing file "elephant.jpg" in the file system.

The data mapping sub-module 205 can create volumes and file paths, in the file system, that correspond to existing account identifiers, container identifiers, and object identifiers in the object storage system. The mapping data 253 can create a volume in the file system for each account identifier in the object storage system, a top-level directory in the file system for each container identifier in the object storage system, and a combination of one or more sub-directories and/or file name for each object identifier. For example, the object storage system stores an image as an object "hawaii.jpg." The object has an object identifier "vacation/hawaii.jpg," a container identifier "pictures", and an account identifier "janedoe." When the object is stored and the identifiers are created, the data mapping sub-module 205 may create a volume labeled "janedoe", a top-level directory named "pictures" in the volume, a sub-directory named "vacation," and a file name "hawaii.jpg." to correspond to the account identifier, container identifier, and object identifier for the object "elephant.jpg." The data mapping sub-module 205 may create a file path "/pictures/vacation/hawaii.jpg" using the volume, directories, and file name. The data mapping sub-module 205 may create and/or update mapping data 251 to map the volume and file path to the existing object "hawaii.jpg" in the object storage system.

The data mapping sub-module 205 can use the data in the requests received by the request sub-module 201 to create identifiers in the object storage system that correspond to existing files in the file system, and to create volumes, directories, and file names in the file system that correspond to existing identifiers in the object storage system. One embodiment for creating mapping data using the data in the requests is described in greater detail below in conjunction with FIG. 4.

The data mapping sub-module 205 can enforce security of the data by retaining access control of the data in both the object storage system and the file system. The data mapping sub-module 205 can encode identity and permission information into a volume and file path to correspond to the identity and permissions that are granted to an existing object. The data mapping sub-module 205 can encode identity and permission information into an account identifier, a container identifier, and/or an object identifier to correspond to the identity and permissions that are granted to an existing volume, directories, and file.

The data accessing sub-module 207 can perform an operation and can send a response for the performed operation. For example, a client device may send, via a WAN or LAN, a HTTP GET request that includes an object identifier, container identifier, and account identifier. The data accessing sub-module 207 can use the identifiers in the request and the mapping data 251 to mount a file system, via a LAN, and get the file that maps to the object identifier, container identifier, and account identifier from the file system. The data accessing sub-module 207 may provide the file to the client device using HTTP over the WAN or LAN. In another example, a client device may send, via a LAN, a file system read command that includes a volume label and file path. The data accessing sub-module 207 can use the volume label and file path in the request and the mapping data 251 to retrieve an object in an object storage system that maps to the volume label and file path. The data accessing sub-module 207 may provide the object as a file to the client device, via the LAN and the file system.

Figure 3:
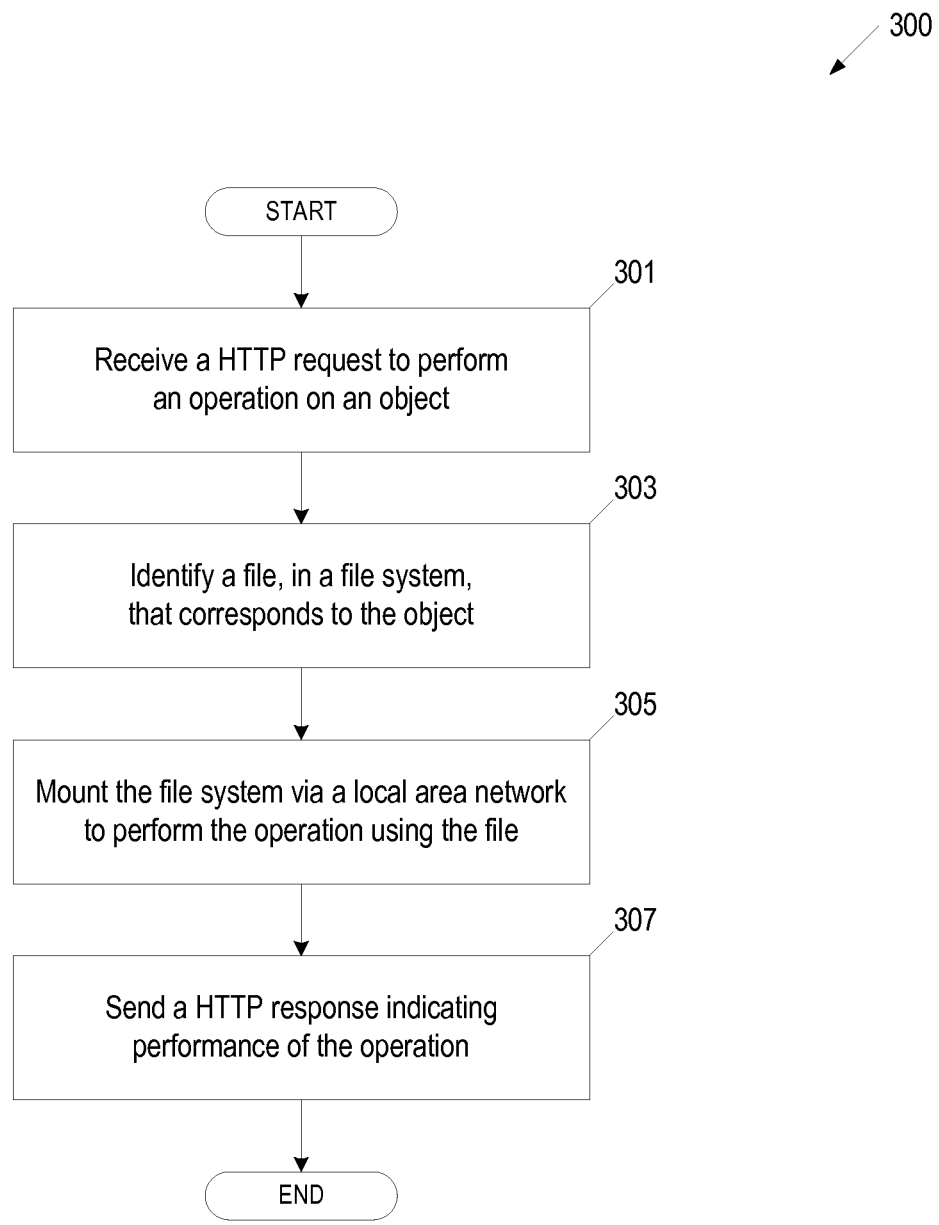
FIG. 3 is a flow diagram illustrating an embodiment for a method of adding object access to data in a file system.

FIG. 3 is a flow diagram of an embodiment of a method 300 of adding object access to data in a file system. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by unified file and object (UFO) module 129 in a server machine 125 of FIG. 1.

At block 301, processing logic receives a hypertext transfer protocol (HTTP) request to perform an operation on an object. The HTTP request includes an object identifier, a container identifier, and an account identifier. The HTTP request can be received via a WAN or a LAN. The request can be received from a client computer system. At block 303, processing logic identifies an existing file that corresponds to the object. Processing logic may create a file that corresponds to the object if the file does not exists. The file is stored in a network attached file system that is accessible via a LAN. Processing logic can use the object identifier, a container identifier, and an account identifier to identify or create the file. One embodiment of identifying or creating a file that corresponds to an object is described in greater detail below in conjunction with FIG. 4.

At block 305, processing logic mounts the network attached file system via the LAN and performs the operation on the file. Processing logic can use the account identifier, container identifier, and object identifier in the HTTP request, and mapping data that is stored in a data store that is coupled to the UFO module to determine the volume label and the file path to use to mount the file system via the LAN. The operation may be, for example, and not limited to, a read, write, or delete operation.

At block 307, processing logic sends a HTTP response via the WAN or the LAN indicating status (e.g., successful, failure) of the performance of the operation. The HTTP response can be sent to a client computer system. For example, the requested operation may be to store the object. Processing logic may create and store the file in the mounted network attached storage file system and send a HTTP response to the client computer system that indicates that the object is stored. A client computer system that is connected to the LAN may mount the network attached storage file system to access the stored file. Results from performing file operations (e.g., write operations) using the mount-point can be can accessed by clients, via an HTTP interface, as objects in an object storage system. For example, the creation of the files, directories, and volumes via the mount-point in the file system exposes corresponding objects, container, and accounts in an object storage system via an HTTP interface.

In another example, the requested operation may be to retrieve the object and the HTTP response to the client computer system may include the file from the network attached storage file system. For example, a file "apple.jpg" may be stored on a volume in a file system in a top-level directory named "photos" and a sub-directory named "food." The file path in the file system for the file may be "/photos/food/apple.jpg." At block 301, processing logic may receive a HTTP GET operation request, such as "GET/photos/food/apple.jpg," from a client device over a WAN. At block 303, processing logic may use the account identifier, container identifier, and object identifier from the GET operation request and mapping data to identify the corresponding volume, top-level directory, and sub-directories and/or file name. For example, processing logic may determine that the identifiers (e.g., account identifier, container identifier, and object identifier) map to the volume labeled "media_files" and the file path "/photos/food/apple.jpg." At block 305, processing logic may mount the file system using the volume label and file path and retrieve the data (e.g., apple.jpg) from the volume in the file system in a top-level directory named "photos" and a sub-directory named "food." At block 307, processing logic may provide the file "apple.jpg" in the file system to the client device over the WAN via a HTTP response.

Figure 4:
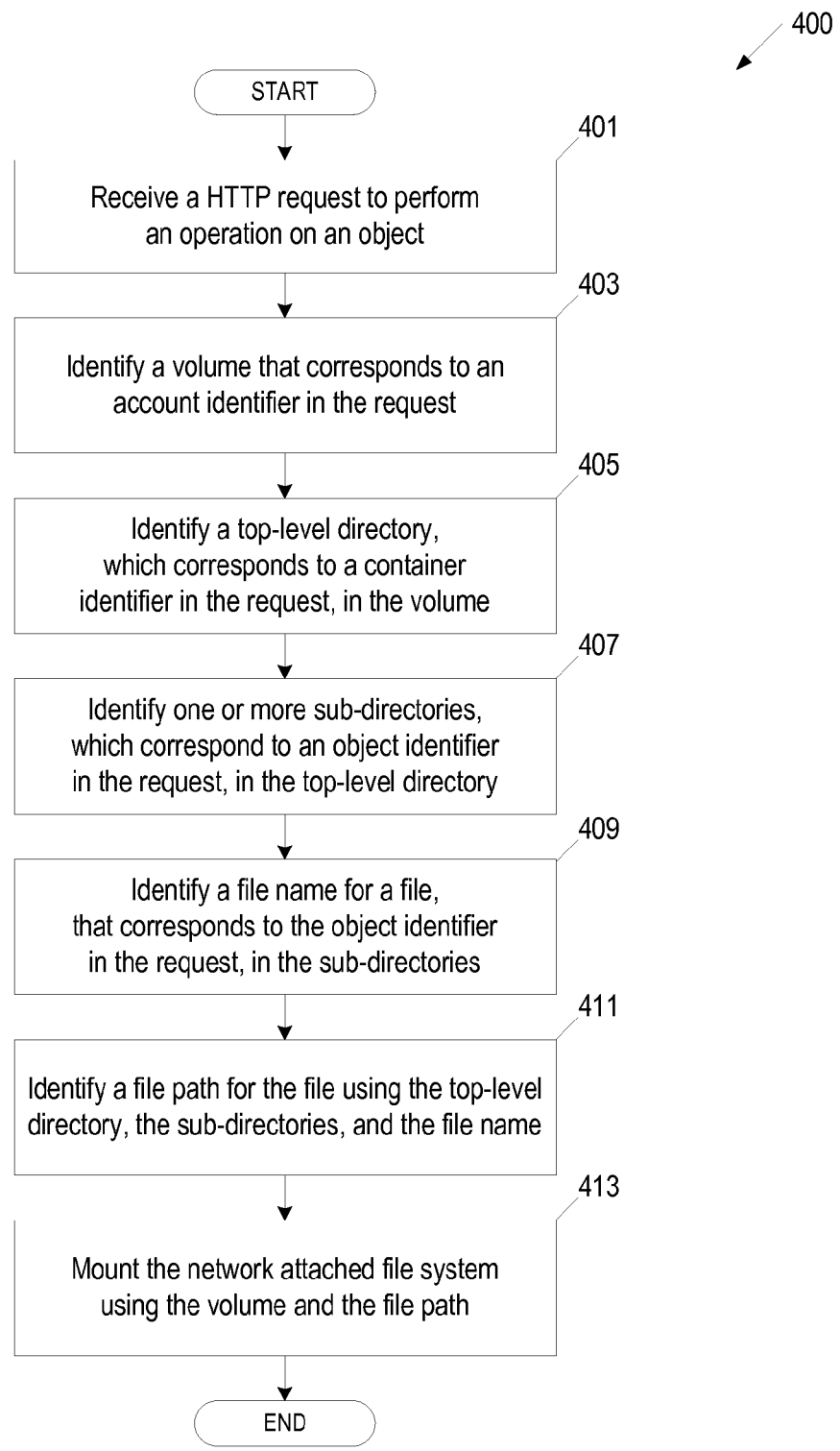
FIG. 4 is a flow diagram illustrating an embodiment for a method of mapping data in a file system to an object storage system.

FIG. 4 is a flow diagram of another embodiment of a method 400 of mapping data in a file system to an object storage system. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by unified file and object (UFO) module 129 in a server machine 125 of FIG. 1.

At block 401, processing logic receives a HTTP request to perform an operation on an object. A HTTP operation request may include an account identifier, container identifier, object identifier, and one or more "/" (slash) delimiters. For example, the format of a PUT operation request may include PUT<account>/<container>/<object>. For example, the PUT operation request may be PUT/media_files/pictures/animals/dog.jpg The account identifier is "media_files." The container identifier is "pictures." The object identifier is "animals/dog.jpg."

At block 403, processing logic identifies a volume that corresponds to the account identifier in the request. The volume that corresponds to the account identifier may not exist in the network attached storage file system, and processing logic may create the volume in the network attached storage file system. The volume, that corresponds to the account identifier in the request, may be an existing volume in the network attached storage file system, and processing logic can use mapping data that is stored in a data store that is coupled to the UFO module to identify the existing volume that corresponds to the account identifier. The mapping data can include account identifiers and corresponding volume identifiers (e.g., volume labels). Processing logic can encode identity and permission information into the volume to correspond to the identity and permissions that are granted to the account identifier of the object.

At block 405, processing logic identifies a top-level directory, in the volume, that corresponds to the container identifier in the request. The top-level directory that corresponds to the container identifier may not exist in the network attached storage file system, and processing logic may create the top-level directory in the network attached storage file system. The top-level directory, that corresponds to the container identifier in the request, may be an existing top-level directory in the network attached storage file system, and processing logic can use the mapping data to identify the existing top-level directory that corresponds to the container identifier. The mapping data can include container identifiers and corresponding top-level directories. Processing logic can encode identity and permission information into the top-level directory to correspond to the identity and permissions that are granted to the container identifier of the object.

At block 407, processing logic identifies one or more sub-directories in the network attached storage file system that correspond to the object identifier in the request. The sub-directories should be in the top-level directory. The "/" (slash) delimiter in the object identifier can indicate one or more sub-directories and a file name. For example, the object identifier may be "animals/dog.jpg" which indicates a sub-directory "animals" and a file name "dog.jpg." The sub-directories that correspond to the object identifier may not exist in the network attached storage file system, and processing logic may create the sub-directories in the network attached storage file system. The sub-directories, that correspond to the object identifier in the request, may be existing sub-directories in the network attached storage file system, and processing logic can use the mapping data to identify the existing sub-directories that correspond to the object identifier. The mapping data can include object identifiers and corresponding sub-directories. Processing logic can encode identity and permission information into the sub-directories to correspond to the identity and permissions that are granted to the object identifier.

At block 409, processing logic identifies a file that corresponds to the object identifier in the request. The file should be in the one or more sub-directories. The file that corresponds to the object identifier may not exist in the network attached storage file system, and processing logic may create the file in the network attached storage file system. The file, that correspond to the object identifier in the request, may be an existing file in the network attached storage file system, and processing logic can use the mapping data to identify the existing file that corresponds to the object identifier. The mapping data can include object identifiers and corresponding files. Processing logic can encode identity and permission information into the file to correspond to the identity and permissions that are granted to the object identifier.

At block 411, processing logic identifies a file path for the file using the top-level directory, the one or more sub-directories, and the file name of the file. At block 413, processing logic mounts the network attached storage file system using the volume identifier (e.g., volume label) and the file path. Processing logic can specify the volume identifier and file path in a mount command to describe the mount point. For example, processing logic receives a HTTP request from a client device over a WAN. The HTTP request may be PUT/media_files/pictures/animals/dog.jpg The account identifier is "media_files." The container identifier is "pictures." The object identifier is "animals/dog.jpg." Processing logic may automatically create a volume having a label "media_files," a top-level directory named "pictures" in the volume "media_files," a sub-directory named "animals" in the top-level directory, and a file named "dog.jpg" in the sub-directory. Processing logic may also automatically form a file path "/pictures/animals/dog.jpg" using the directories and file name. Processing logic may map in the mapping data the account identifier, container identifier, and object identifier to the corresponding volume, directories, and file name. Processing logic can mount the file system by specifying the volume identifier (e.g., media_files) and file path (e.g., /pictures/animals/dog.jpg) in a mount command and store the dog.jpg file in the file system.

Figure 5:
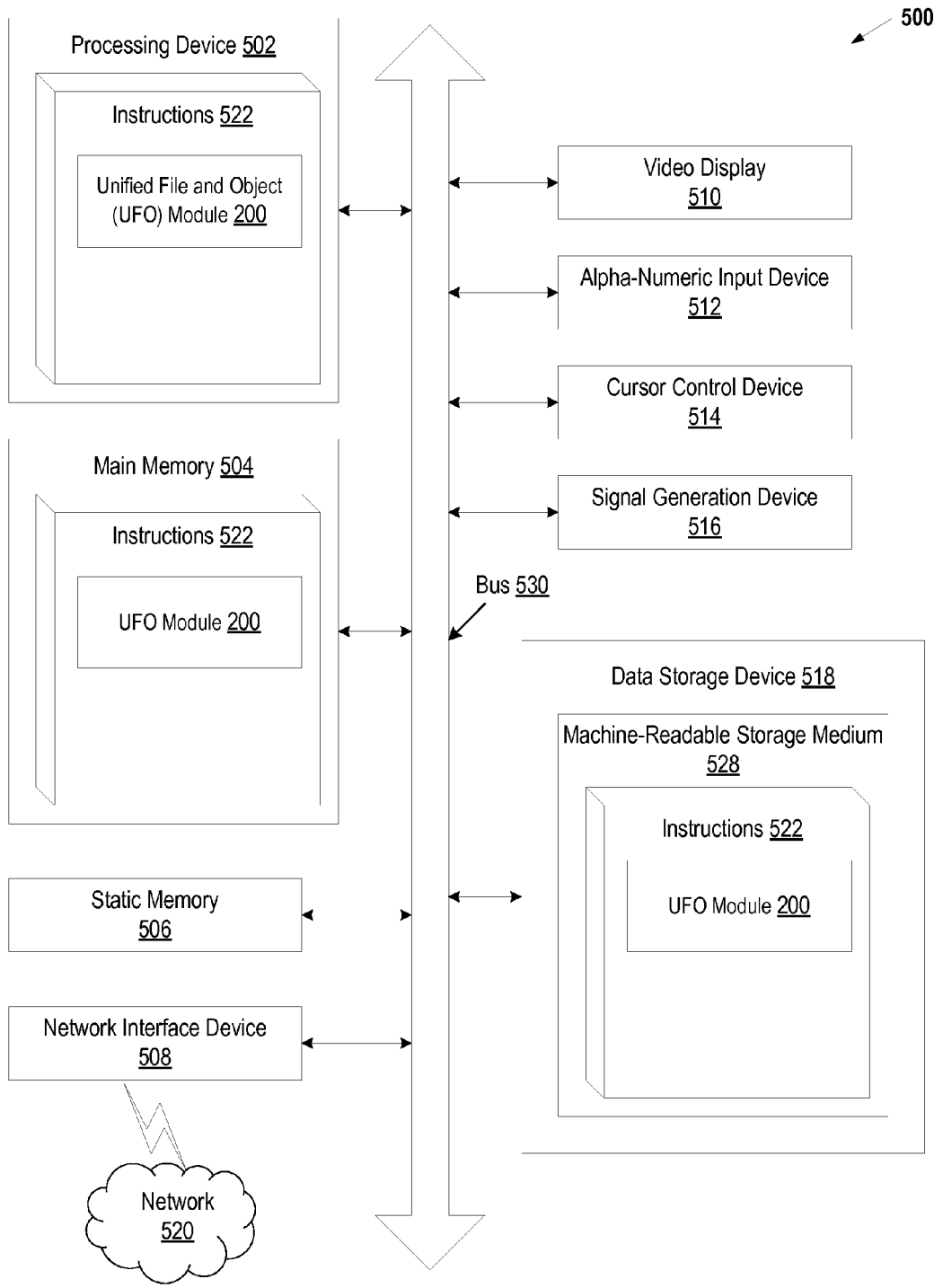
FIG. 5 is a block diagram of an exemplary computer system that may perform one or more of the operations described herein.

FIG. 5 illustrates a representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one embodiment, the instructions 522 include instructions for a unified file and object (UFO) module (e.g., UFO module 200 of FIG. 2) and/or a software library containing methods that call modules in a UFO module. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "identifying" or "mounting" or "sending" or "creating" or "specifying" or "correlating" or "mapping" or "accessing" or "exposing" the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
   receiving, from a client computing device by a processing device via a wide area network, a request to perform an operation on an object in a first storage system;
   determining a hash value associated with an identifier of the object from the request;
   identifying an object server of a plurality of object servers of the first storage system to forward the request to perform the operation on the object by using a hash value associated with the identifier of the object;
   receiving mapping data that associates an account identifier from the request to perform the operation on the object in the first storage system to a volume of a file system of a second storage system;
   identifying, by the processing device, a file in the second storage system that corresponds to the object at the object server in the first storage system in view of the identifier of the object and the volume that is associated with the account identifier from the mapping data; and
   mounting, by the processing device via a local area network and in response to receiving the request via the wide area network from the client computing device, the second storage system to perform the operation using the file in the second storage system that corresponds to the object in the first storage system, wherein the second storage system is mounted by using the account identifier from the mapping data, and wherein the account identifier is received via the wide area network.

2. The method of claim 1, further comprising:
   receiving a file system request, from the client computing device using a mount-point via a local area network, to modify the file, wherein the modified file is accessible as an object using hypertext transfer protocol (HTTP).

3. The method of claim 1, further comprising:
   sending a file in the second storage system to the client computing device in a hypertext transfer protocol (HTTP) response in response to the request.

4. The method of claim 1, further comprising:
   creating the file and one or more directories for the file in the second storage system via a mount-point, wherein the file and the one or more directories are accessible to a second client computing device as an object and a container using hypertext transfer protocol (HTTP).

5. The method of claim 1, wherein identifying the file in the second storage system that corresponds to the object in the first storage system comprises:
   identifying a top-level directory, in the second storage system, that corresponds to a container identifier in the request;
   identifying at least one of a file name or one or more sub-directories, in the second storage system, that correspond to an object identifier in the request; and
   identifying a file path for the file using the top-level directory and at least one of the one or more sub-directories or the file name.

6. The method of claim 1, wherein mounting the second storage system comprises:
   specifying the volume, in the second storage system, that corresponds to the account identifier in the request; and
   specifying a file path for the file, the file path comprising a top-level directory that corresponds to a container identifier in the request, and at least one of one or more sub-directories or a file name that correspond to an object identifier in the request.

7. The method of claim 1, wherein receiving the request comprises:
   correlating a plurality of object server computing devices in a local area network to one of the plurality of object server computing devices to create a non-distributed object storage system; and
   receiving, by a proxy server computing device, the request from a client computing device, wherein the proxy server computing device sends the request to the one of the plurality of object server computing devices in the non-distributed object storage system.

8. The method of claim 7, wherein correlating the plurality of object server computing devices comprises:
   mapping a plurality of object identifiers to the one of the plurality of object server computing devices.

9. A non-transitory computer-readable medium having instructions that, when executed by a processing device, cause the processing device to:
   receive, by the processing device from a client computing device over a wide area network, a request associated with a file system command to perform an operation on an object in a first storage system;
   determine a hash value associated with an identifier of the object from the file system command;
   identify an object server of a plurality of object servers of the first storage system to forward the request to perform the operation on the object by using a hash value associated with the identifier of the object
   receive mapping data that associates an account identifier from the request to perform the operation on the object in the first storage system to a volume of a file system of a second storage system;
   identify, by the processing device, a file in the second storage system that corresponds to the object at the object server in the first storage system in view of the identifier of the object and the volume that is associated with the account identifier from the mapping data; and
   access the second storage system by using the account identifier from the mapping data to perform the operation using the file in the second storage system that corresponds to the object in the first storage system.

10. The non-transitory computer-readable medium of claim 9, the instructions further causing the processing device to:
    send, via the wide area network, a file system response to the client computing device, the file system response comprising the file in the second storage system.

11. The non-transitory computer-readable medium of claim 9, the instructions further causing the processing device to:
    create the file and a container in the second storage system, wherein the file and the container are accessible to a second client computing device in the local area network as the object and a directory from the mount-point.

12. The non-transitory computer-readable medium of claim 11, wherein the second client computing device modifies the file using the object and the mount-point over the local area network and the modification is accessible in the file using hypertext transfer protocol (HTTP).

13. The non-transitory computer-readable medium of claim 9, wherein to identify the file in the second storage system that corresponds to the object in the first storage system, the processing device is to:
    identify a container identifier, in the second storage system, that corresponds to a top-level directory in the file system command; and identify an object identifier, in the second storage system, that corresponds to at least one of a file name or one or more sub-directories in the file system command.

14. The non-transitory computer-readable medium of claim 9, wherein to access the second storage system, the processing device is to:
specify the account identifier, in the second storage system, that corresponds to volume label of the volume in the file system command;
specify a container identifier in the second storage system that correspond to a top-level directory in the file system command; and
specify an object identifier that corresponds to at least one of one or more sub-directories or a file name in the file system command.

15. A system comprising:
a memory; and
a processing device, operatively coupled with the memory, to:
create an object in a first storage system to store data in the first storage system;
create correlation data that identifies an object server of a plurality of object servers of the first storage system to forward a request to perform an operation on the object by using a hash value associated with an identifier of the object;
create mapping data that associates an account identifier from the request to perform the operation on the object in the first storage system to a volume of a file system of a second storage system;
create distribution data that identifies the second storage system that stores a file corresponding to the object in view of the identifier of the object and the volume that is associated with the account identifier from the mapping data;
expose, to a client computing device via a wide area network, the file in the second storage system that corresponds to the object in the first storage system from a mount-point in the second storage system, wherein the mount point is selected by using the account identifier from the mapping data received over the wide area network and the distribution data.

16. The system of claim 15, wherein a second processing device modifies the object using the file in the second storage system that corresponds to the object in the first storage system from the mount-point in the second storage system.

17. The system of claim 16, wherein the modification is visible by accessing the first storage system using hypertext transfer protocol.

18. The system of claim 15, wherein the processing device is further to:
create a second file and a top-level directory via the mount-point in the second storage system to store second data in the second storage system;
expose the second file as a second object in the first storage system using hypertext transfer protocol (HTTP); and
expose the top-level directory as a container in the first storage system using HTTP.

19. The system of claim 18, wherein a second processing device modifies the second file using the second object from the first storage system using HTTP.

20. The system of claim 19, wherein the modification is visible from the mount-point in the second storage system.

* * * * *